US009276777B2

(12) United States Patent
Balraj et al.

(10) Patent No.: US 9,276,777 B2
(45) Date of Patent: Mar. 1, 2016

(54) METHOD FOR DETERMINING FEEDBACK INFORMATION AND CIRCUIT TO PERFORM SUCH METHOD

(71) Applicant: Intel Mobile Communications GmbH, Neubiberg (DE)

(72) Inventors: Rajarajan Balraj, Duesseldorf (DE); Biljana Badic, Duesseldorf (DE); Tobias Scholand, Muelheim (DE)

(73) Assignee: Intel Deutschland GmbH, Neubiberg (DE)

( * ) Notice: Subject to any disclaimer, the term of this patent is extended or adjusted under 35 U.S.C. 154(b) by 444 days.

(21) Appl. No.: 13/651,614

(22) Filed: Oct. 15, 2012

(65) Prior Publication Data

US 2014/0105102 A1  Apr. 17, 2014

(51) Int. Cl.
*H04L 25/02* (2006.01)
*H04L 25/03* (2006.01)
*H04B 7/04* (2006.01)
*H04B 7/06* (2006.01)
*H04B 7/02* (2006.01)
*H04L 1/00* (2006.01)
*H04B 17/345* (2015.01)

(52) U.S. Cl.
CPC ............ *H04L 25/0204* (2013.01); *H04B 7/024* (2013.01); *H04B 7/0413* (2013.01); *H04B 7/063* (2013.01); *H04B 7/0632* (2013.01); *H04B 7/0639* (2013.01); *H04L 1/0026* (2013.01); *H04L 1/0028* (2013.01); *H04L 25/0224* (2013.01); *H04L 25/0242* (2013.01); *H04L 25/03019* (2013.01); *H04L 25/03955* (2013.01); *H04B 17/345* (2015.01)

(58) Field of Classification Search
CPC . H04W 24/10; H04W 28/0236; H04W 36/20; H04W 92/10; H04B 7/0413; H04B 7/0456; H04B 7/0626; H04B 7/063; H04B 7/0632; H04B 7/0634; H04B 7/0639; H04L 25/0204; H04L 25/0224; H04L 25/03019; H04L 25/03955
USPC ........... 370/310, 331–332, 339; 455/69, 63.1, 455/63.2, 63.3, 65
See application file for complete search history.

(56) References Cited

U.S. PATENT DOCUMENTS

2006/0293056 A1*  12/2006  Kim et al. ...................... 455/442
2012/0114028 A1*  5/2012  Davydov et al. .............. 375/224
(Continued)

FOREIGN PATENT DOCUMENTS

WO    WO2011126025    * 10/2011    ............ H04W 16/28

OTHER PUBLICATIONS

S. Schwarz, et al.; "Mutual Information based Calculation of the Precoding Matrix Indicator for 3GPP UMTS/LTE", 2010 International ITG Workshop on Smart Antennas (WSA 2010), p. 52-58.

(Continued)

*Primary Examiner* — Un C Cho
*Assistant Examiner* — Jeremy Costin
(74) *Attorney, Agent, or Firm* — Eschweiler & Associates, LLC

(57) ABSTRACT

A method includes receiving a first signal at a circuit from a first base station and receiving a second signal at the circuit from a second base station different from the first base station. The method further includes determining a first channel estimate based on the first signal, determining a second channel estimate based on the second signal and determining a feedback information based on the first channel estimate and based on the second channel estimate.

19 Claims, 8 Drawing Sheets

(56) References Cited

U.S. PATENT DOCUMENTS

| | | | |
|---|---|---|---|
| 2013/0077518 A1* | 3/2013 | Abe et al. | 370/252 |
| 2013/0114428 A1* | 5/2013 | Koivisto et al. | 370/252 |
| 2013/0208604 A1* | 8/2013 | Lee et al. | 370/252 |
| 2013/0344909 A1* | 12/2013 | Davydov et al. | 455/501 |
| 2014/0219373 A1* | 8/2014 | Mobasher et al. | 375/267 |

OTHER PUBLICATIONS

S. Brueck; "Heterogeneous Networks in LTE-Advanced", 2011 8th International Symposium on Wireless Communication Systems, p. 171-175.

S. Schwarz; "Calculation of the Spatial Preprocessing and Link Adaption Feedback for 3GPP UMTS/LTE", IEEE Wireless Advanced 2010, p. 1-6.

A. Damnjanovic, et al.; "A Survey on 3GPP Heterogeneous Networks", IEEE Wireless Communications, Jun. 2011, p. 10-21.

R. Irmer, et al.; "Coordinated Multipoint: Concepts, Performance, and Field Trial Results", IEEE Communications Magazine, Feb. 2011, p. 102-111.

3GPP TSG RAN WG1 Meeting #64; R1-110743; Taipei, Taiwan, Feb. 21-25, 2011, p. 1-4.

* cited by examiner

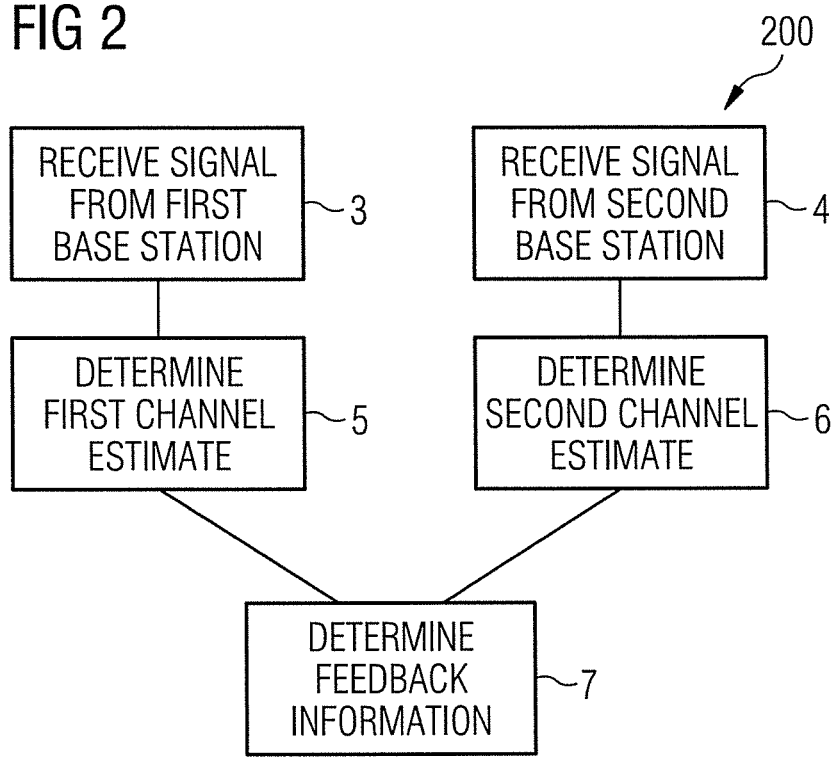
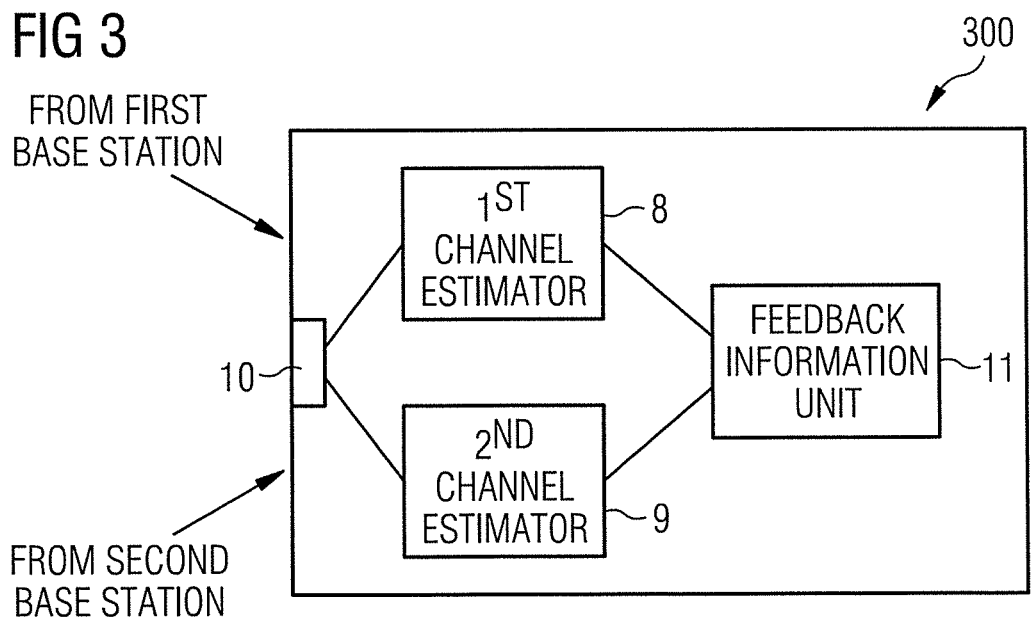

FIG 4

CSI-RS transmission for two co-operating eNodeBs (4 antenna ports each)

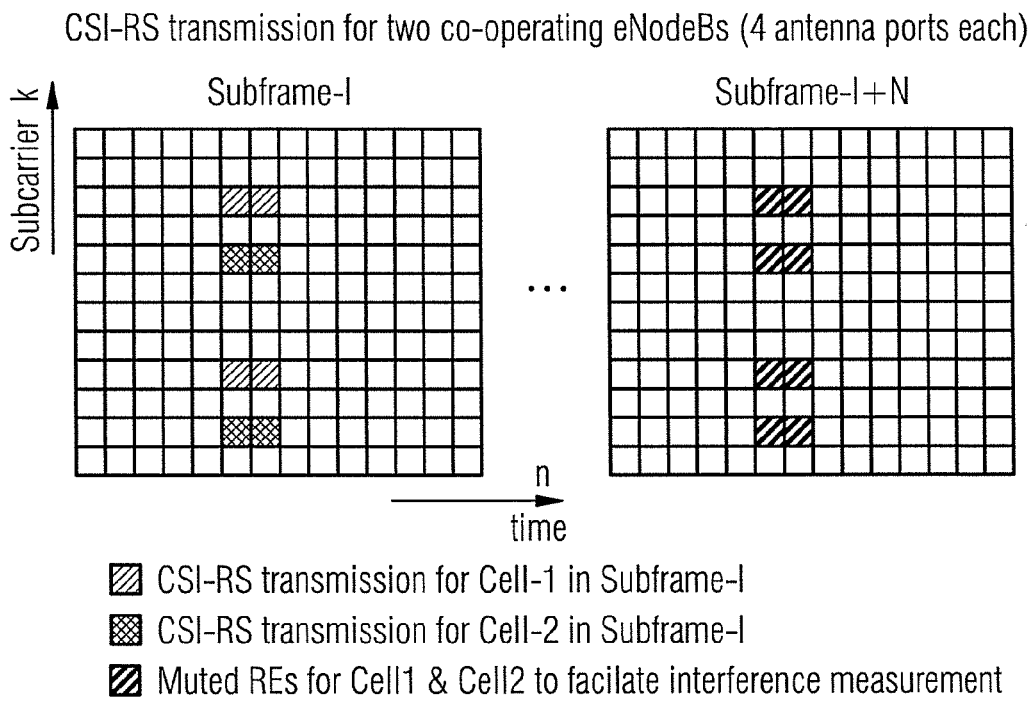

▨ CSI-RS transmission for Cell-1 in Subframe-l
▧ CSI-RS transmission for Cell-2 in Subframe-l
▨ Muted REs for Cell1 & Cell2 to facilate interference measurement

FIG 5

CSI-RS transmission for two co-operating eNodeBs (4 antenna ports each)

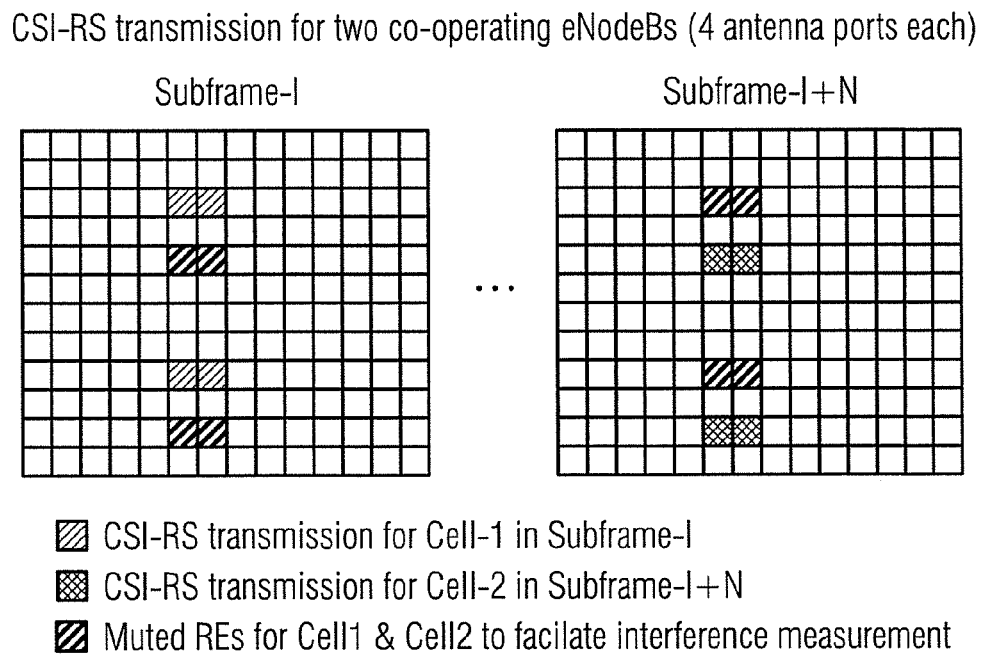

▨ CSI-RS transmission for Cell-1 in Subframe-l
▧ CSI-RS transmission for Cell-2 in Subframe-l+N
▨ Muted REs for Cell1 & Cell2 to facilate interference measurement

FIG 6
CSI-RS transmission for three co-operating eNodeBs
(1x - 4 antenna ports, 2x - 2 Antenna ports)

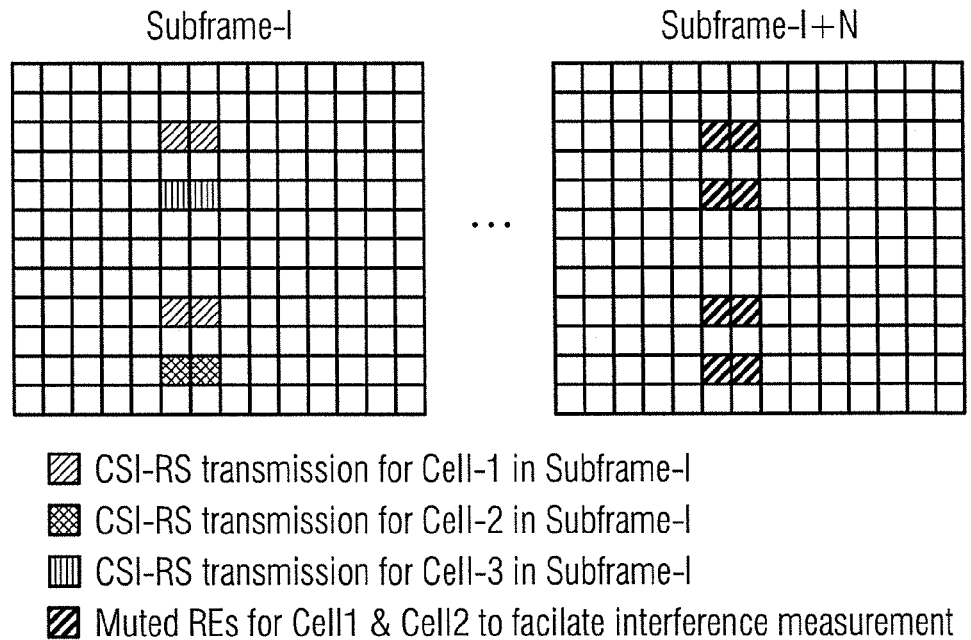

Subframe-I  Subframe-I+N

- ⊡ CSI-RS transmission for Cell-1 in Subframe-I
- ▩ CSI-RS transmission for Cell-2 in Subframe-I
- ▥ CSI-RS transmission for Cell-3 in Subframe-I
- ⊡ Muted REs for Cell1 & Cell2 to facilate interference measurement

FIG 7
CSI-RS transmission for three co-operating eNodeBs
(1x - 4 antenna ports, 2x - 2 Antenna ports)

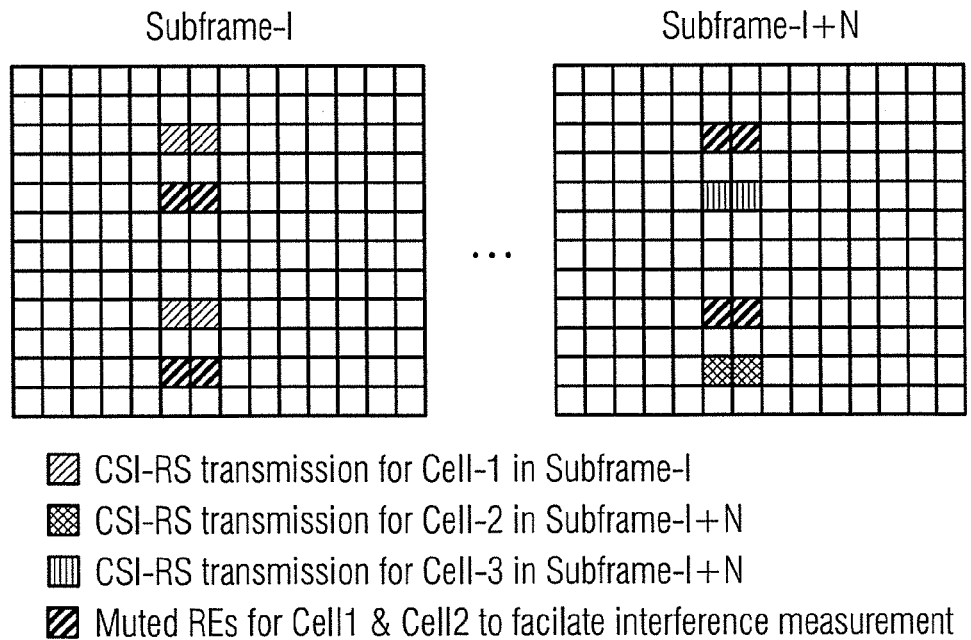

Subframe-I  Subframe-I+N

- ⊡ CSI-RS transmission for Cell-1 in Subframe-I
- ▩ CSI-RS transmission for Cell-2 in Subframe-I+N
- ▥ CSI-RS transmission for Cell-3 in Subframe-I+N
- ⊡ Muted REs for Cell1 & Cell2 to facilate interference measurement

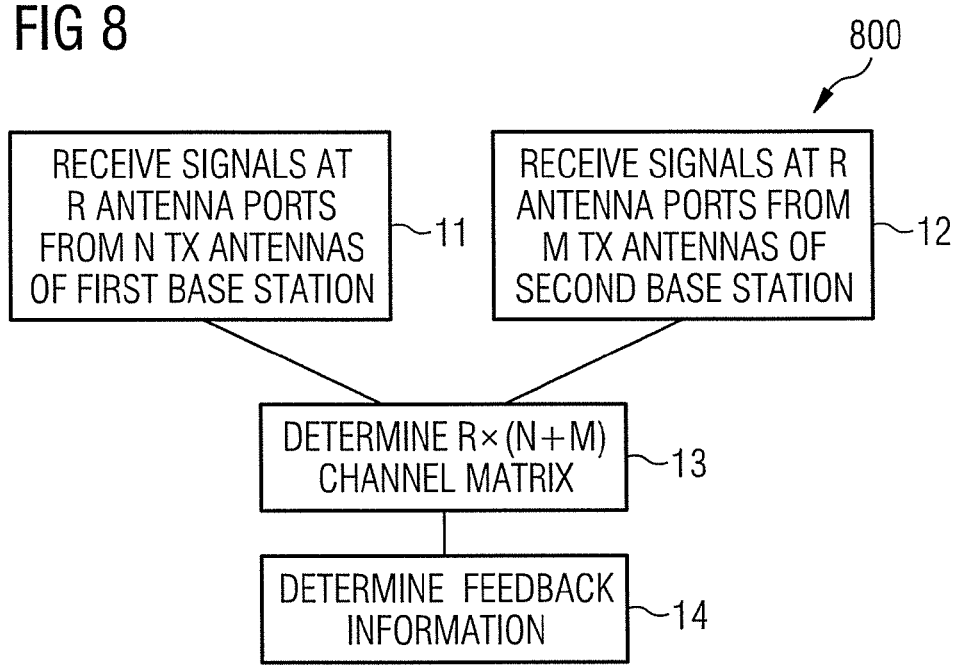
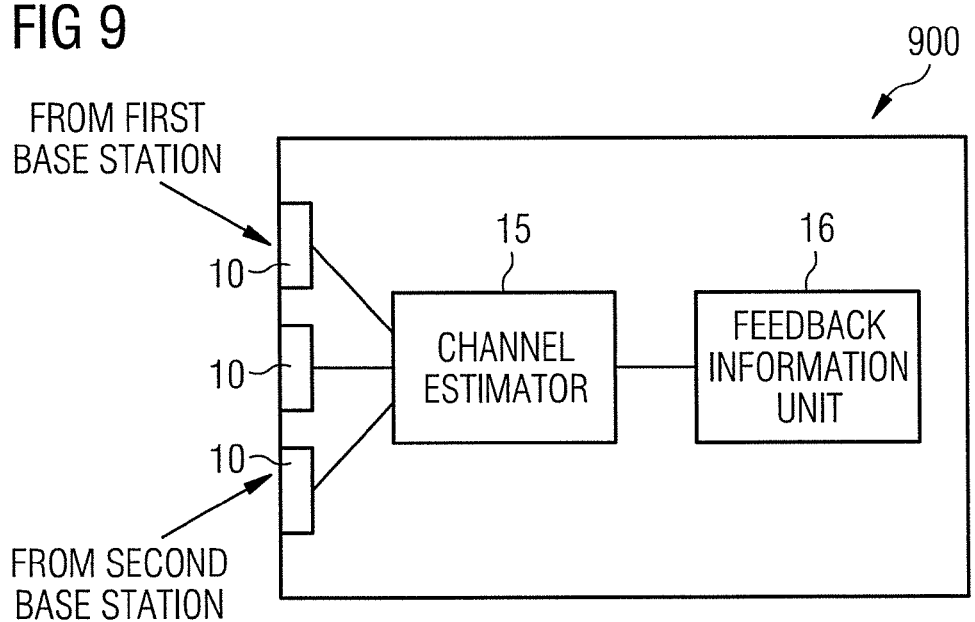

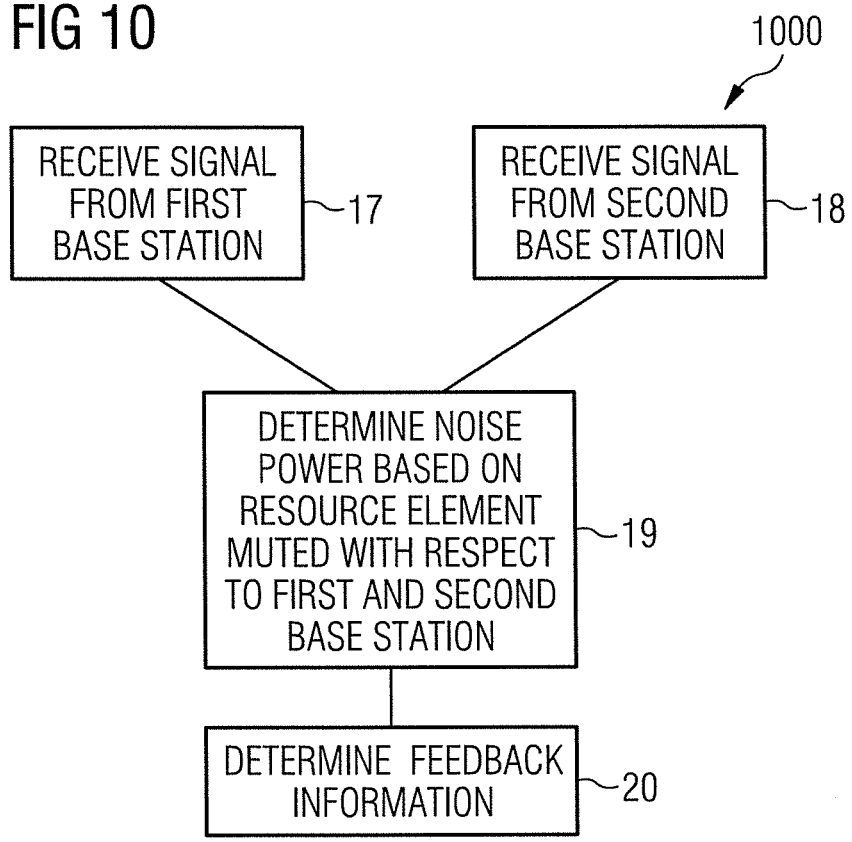

METHOD FOR DETERMINING FEEDBACK INFORMATION AND CIRCUIT TO PERFORM SUCH METHOD

FIELD

The present invention relates to mobile communications. In particular, the invention relates to methods for determining feedback information and circuits configured to perform such methods.

BACKGROUND

In a radio communications system, a mobile station may communicate with multiple base stations and provide feedback information to the base stations. Based on the feedback information, a transmission of data from the base stations to the mobile station may be adjusted. Methods for determining feedback information and circuits to perform such methods constantly have to be improved. In particular, it may be desirable to provide feedback information resulting in an improved communication between a mobile station and a base station.

BRIEF DESCRIPTION OF THE DRAWINGS

Aspects of the disclosure are made more evident by way of example in the following detailed description when read in conjunction with the attached drawing figures, wherein:

FIG. 2 is a flow chart that illustrates an exemplary method for determining a feedback information based on first and second channel estimates based on signals received from different base stations.

FIG. 3 illustrates an exemplary circuit configured to determine a feedback information.

FIG. 4 illustrates a signal pattern which may be used for a radio communications system including a mobile station and two base stations, wherein each of the base stations has four antenna ports.

FIG. 5 illustrates a signal pattern which may be used for a radio communications system including a mobile station and two base stations, wherein each of the base stations has four antenna ports.

FIG. 6 illustrates a signal pattern which may be used for a radio communications system including a mobile station and three base stations, wherein one of the base stations has four antenna ports and each of the remaining two base stations has two antenna ports.

FIG. 7 illustrates a signal pattern which may be used for a radio communications system including a mobile station and three base stations, wherein one of the base stations has four antenna ports and each of the two remaining base stations has two antenna ports.

FIG. 8 is a flow chart that illustrates an exemplary method in which a feedback information is determined based on a channel matrix.

FIG. 9 illustrates an exemplary circuit configured to determine a feedback information.

FIG. 10 is a flow chart that illustrates an exemplary method in which a feedback information is determined based on a noise power that is based on a resource element which is muted with respect to a first base station and a second base station.

DETAILED DESCRIPTION

Figure 1A:
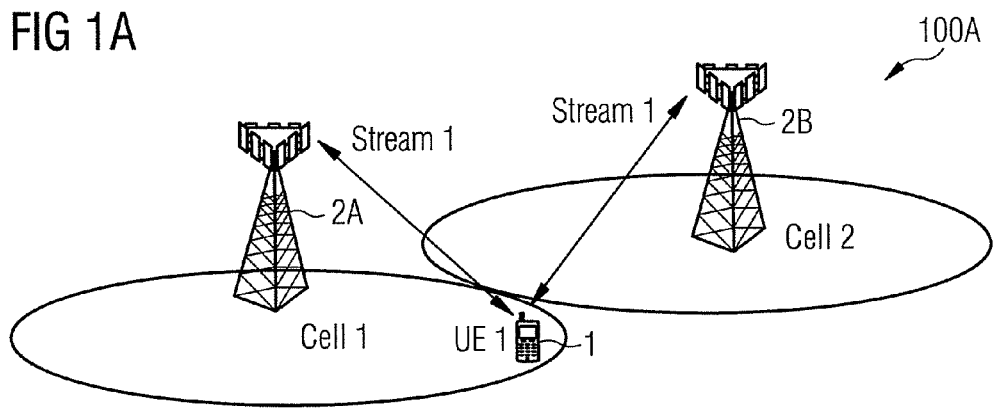
FIG. 1A illustrates a radio communications system including a mobile station and multiple base stations.

In the following detailed description, reference is made to the accompanying drawings, which form a part thereof, and in which are shown by way of illustration aspects in which the disclosure may be practiced. It is understood that further aspects may be utilized and structural or logical changes may be made without departing from the scope of the present disclosure. The features of the various exemplary aspects described herein may be combined with each other, unless specifically noted otherwise. The following detailed description is therefore not to be taken in a limiting sense and the scope of the present disclosure is defined by the appended claims.

As employed in this specification, the terms "coupled" and/or "connected" are not meant to mean in general that elements must be directly coupled or connected together. Intervening elements may be provided between the "coupled" or "connected" elements. However, although not restricted to that meaning, the terms "coupled" and/or "connected" may also be understood to optionally disclose an aspect in which the elements are directly coupled or connected together without intervening elements provided between the "coupled" or "connected" elements.

As employed in this specification, to the extent that the terms "include", "have", "with" or other variants thereof are used in either the detailed description or the claims, such terms are intended to be inclusive in a manner similar to the term "comprise". The term "exemplary" is merely meant as an example, rather than the best or optimal.

Devices in accordance with the disclosure may be implemented in discrete circuits, partially integrated circuits, or fully integrated circuits. In addition, devices in accordance with the disclosure may be implemented on a single semiconductor chip or on multiple semiconductor chips connected to each other. It is understood that components of the specified devices may be implemented in software or in dedicated hardware or partially in software and partially in dedicated hardware.

Devices in accordance with the disclosure may be illustrated in form of block diagrams. It is understood that separated blocks of such block diagrams do not necessarily relate to hardware components or software components that need to be separated in practice. Rather, it may also be possible that a plurality of such blocks (in the block diagram) may be implemented in the form of a single component (in practice) or that a single block (in the block diagram) may be implemented in form of multiple components (in practice).

Block diagrams illustrating methods do not need to necessarily imply a specific chronological order of included method steps. Rather, indicated method steps may be performed in an arbitrary order, if reasonable from a technical point of view. Further, one or more method steps may at least partially be performed at a same time or during a same time period.

In the following, various methods in accordance with the disclosure are described. It is understood that each method may be modified by adding further method steps. In particular, a method may be extended by one or more method steps described in connection with a respective other method.

Additional method steps may also be derived by all further parts of this specification, unless specifically noted otherwise. It is understood that specified features of individual methods may be combined in arbitrary ways resulting in further aspects which are not explicitly described for the sake of simplicity.

It is noted that comments made in connection with a described method may also hold true for a corresponding circuit or device configured to perform the method and vice versa. For example, if a specific method step is specified, a corresponding circuit may include a unit to perform the described method step, even if such unit is not explicitly described or illustrated in the figures.

Methods and devices in accordance with the disclosure may be used in various wireless communication networks, e.g. CDMA, TDMA, FDMA, OFDMA, SC-FDMA networks, etc. A CDMA network may implement a radio technology such as UTRA, cdma2000, etc. UTRA includes W-CDMA and other CDMA variants. cdma2000 covers IS-2000, IS-95 and IS-856 standards. A TDMA network may implement GSM and derivatives thereof such as, for example, EDGE, EGPRS, etc. An OFDMA network may implement E-UTRA, UMB, IEEE 802.11 (Wi-Fi), IEEE 802.16 (WiMAX), IEEE 802.20, Flash-OFDM®, etc. UTRA and E-UTRA are part of UMTS. The specified methods and devices may be used in the framework of Multiple Input Multiple Output (MIMO). MIMO is a part of wireless communications standards such as IEEE 802.11n (Wi-Fi), 4G, 3GPP LTE, WiMAX and HSPA+.

Radio communications systems (or networks or systems) as described herein may include one or more receivers as well as one or more transmitters. A transmitter may comprise a base station or a transmitting device included in a user's device, such as a mobile radio transceiver, a handheld radio device or any similar device. A receiver may be included in a mobile radio transceiver or a mobile station. For example, a mobile station may be represented by a cellular phone, a smartphone, a tablet PC, a laptop, etc. Circuits as described herein may be included in such receivers or transceivers.

It is noted that considered base stations may be of arbitrary type. For example, a base station may be a macro base stations that may transmit at a high power level of about 5 W to about 40 W, a pico cell, a femto cell or a relay, each of which may transmit at a lower power level of about 100 mW to about 2 W.

Methods and devices in accordance with the disclosure may utilize feedback information. For example, feedback information may comprise channel state information (CSI). In wireless communications, CSI may refer to channel properties of a communication link. Such information may specify how a signal propagates from a transmitter to a receiver and thereby may represent the combined effect of, for example, scattering, fading and power decay with distance. CSI may support link adaptation in order to achieve reliable communications with high data rates in radio communications systems. CSI may be estimated at the receiver and may be fed back to the transmitter in a quantized form.

CSI may include a channel quality indicator (CQI). A CQI may be based on a measurement of a communication quality of one or more wireless channels. Hence, a CQI may be a value (or values) representing a measure of a channel quality for a given channel. In particular, the term CQI may refer to information determined at a mobile station as well as to information determined at a mobile station and fed back to a base station and processed by the base station. For example, a high value CQI may be indicative of a channel with high quality and vice versa. A CQI may be computed by utilizing values of a Signal-to-Noise Ratio (SNR), Signal-to-Interference plus Noise Ratio (SINR), Signal-to-Noise plus Distortion Ratio (SNDR), a Signal to Leakage plus Noise Ratio (SNLR), etc., of a channel. Of course, a CQI may depend on an employed modulation scheme. For example, a communications system based on CDMA may utilize a different CQI compared to a communications system utilizing OFDM. In MIMO and space-time coded systems, a CQI may also depend on the receiver type.

CSI may include a Precoding Matrix Indicator (PMI). Methods and devices in accordance with the disclosure may utilize codebook entries like precoding weights, precoding vectors, precoding matrices, etc. In radio communications systems, a precoding scheme may be based on weighting multiple data streams emitted from the transmit antennas of a base station with weights that may be chosen to maximize a signal power at the receiver output, a link throughput, and/or a sum capacity. In practice, a precoding codebook including multiple predetermined precoding weights (or precoding vectors or precoding matrices) may be stored in a base station such that appropriate weights may be chosen from the codebook based on a Precoding Matrix Indicator (PMI), for example. It is noted that examples for codebooks, codebook entries and associated PMI values may be found in 3GPP standards.

In a radio communications system, different codebooks may be defined depending on a number of transmit antenna ports of an employed base station. The codebooks may provide precoding support for a simultaneous transmission of a variable number of layers (data streams) to an identical target mobile station. The PMI may be an index in the codebooks defined for a given number of transmit antenna ports (e.g. 1, 2, 4 in LTE and up to 8 for LTE-A).

CSI may include a Rank Indicator (RI). A channel RI may indicate the number of layers and the number of different signal streams transmitted in a downlink direction. For example, when using a Single Input Multiple Output (SIMO) one layer may be utilized. In case of a 2×2 MIMO system with spatial multiplexing, two layers may be used.

Methods and devices in accordance with the disclosure may be based on a Coordinated Multi-Point (CoMP) scheme. In CoMP, multiple signals may be sent from multiple base stations or radio cells to a mobile station. By coordinating a transmission among the multiple cells, interference from other cells may be reduced and the power of the desired signals may be increased. Details on CoMP schemes may be specified by 3GPP standards.

It is noted that the contents of the document "Calculation of the Spatial Preprocessing and Link Adaption Feedback for 3GPP UMTS/LTE", in IEEE Proceedings of Wireless Advanced, 2010 by S. Schwarz, C. Mehlfuehrer and M. Rupp is included herein by reference.

FIG. 1A illustrates a radio communications system 100A including a mobile station 1, a first base station 2A and a second base station 2B. It is understood that the radio communications system 100A may include further mobile stations and/or further base stations of an arbitrary number. The radio cell, Cell 1, served by the first base station 2A is indicated by a circle around the first base station 2A, while the radio cell Cell 2 served by the second base station 2B is indicated by a circle around the second base station 2B. It is noted that the terms "base station", "cell" and "radio cell" may be used synonymously in this specification. In FIG. 1A, the mobile station 1 is located at an edge of Cell 1. In such location, the mobile station 1 may particularly be subject to interferences between signals broadcast by both base stations 2A and 2B.

The base stations 2A and 2B may be of a different type or of a similar type. For example, each of the base stations 2A and 2B may be a macro cell. In another example, base station 2A may be a femto cell and base station 2B may be a macro cell. Cell 1 may then be arranged within the boundaries of Cell 2. In particular, the radio communications system 100A may be a heterogeneous network. A heterogeneous network may utilize a mix of diverse base stations deployed in order to improve a spectral efficiency per unit area. A layered network deployment may consist of a regular placement of macro base stations, overlaid with several pico cell, femto cells, and relays, which typically transmit at lower power levels. The lower power cells are deployed to eliminate coverage holes in the macro cells and to improve efficiency in hot spots.

In a heterogeneous network a difference between low and high power base stations may result in an uneven distribution of data rates and uneven user experience among mobile stations located in the network. For example, a pico base station may be characterized by substantially lower transmit power compared to a macro base station. Due to a large disparity between the transmit power levels of the two different base stations types, the coverage of a pico base station may be limited compared to that of a macro base station. A larger coverage of macro base stations may attract more users even if the base station may not have enough resources to efficiently serve all these mobile stations user terminals. At the same time, the resources of the smaller power base station may remain underutilized.

In order to deal with an interference scenario as it may occur in radio communications system 100A, an interference management scheme enabling resource coordination among the base stations 2A and 2B may be employed such that interferences between signals broadcast by different base stations may be avoided or exploited. For example, an interference management scheme may be based on a CoMP concept. CoMP may simultaneously support multiple transmission points to serve mobile devices in high interference areas that occur between cells (inter-cell).

In an interference management scheme, mobile station 1 may provide feedback information to each of the base stations 2A and 2B. In FIG. 1A, the mobile station 1 feeds back similar feedback information to the first base station 2A and to the second base station 2B, as "Stream 1" and "Stream 1" respectively. An exemplary transmission of such type may be a CoMP Rank 1 transmission where the mobile station 1 feeds back a single-cell PMI/CQI/RI. Based on the received feedback information, each of the base stations 2A and 2B may adjust its data transmission.

Figure 1B:
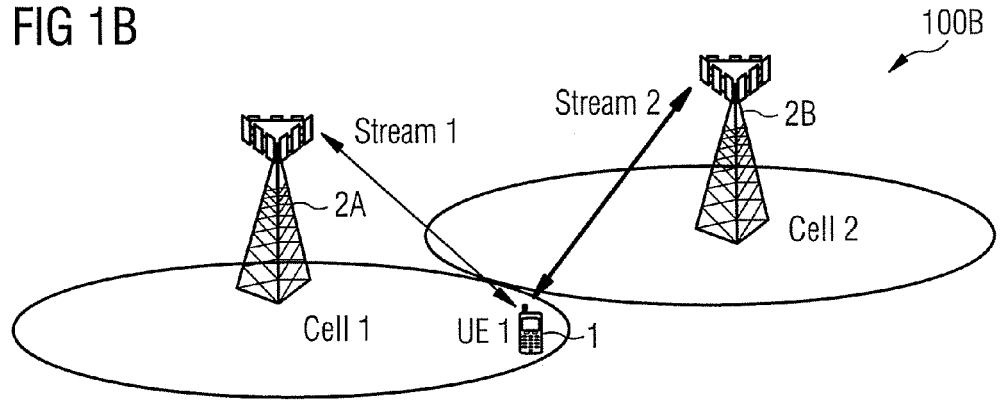
FIG. 1B illustrates a radio communications system including a mobile station and multiple base stations.

FIG. 1B illustrates a radio communications system 100B including a mobile station 1 and two base stations 2A and 2B. The radio communications system 100B is similar to the radio communications system 100A of FIG. 1A. Comments made in connection with FIG. 1A may thus also hold true for FIG. 1B. In contrast to FIG. 1A, the mobile station 1 transmits feedback information to the first base station 2A as "Stream 1", which may differ from feedback information transmitted to the second base station 2B as "Stream 2". An exemplary transmission of such type may be a CoMP Rank 2 transmission where the mobile station 1 feeds back a multi-cell PMI/CQI/RI.

FIG. 2 is a flow chart that illustrates a method 200 in accordance with the disclosure including method acts 3 to 7. At 3, a first signal is received at a circuit from a first base station. At 4, a second signal is received at the circuit from a second base station which is different from the first base station. At 5, a first channel estimate is determined based on the first signal. At 6, a second channel estimate is determined based on the second signal. At 7, feedback information is determined based on the first channel estimate and based on the second channel estimate. It is noted that a more detailed method similar to method 200 is described below.

FIG. 3 illustrates a circuit 300 in accordance with the disclosure. An operation of the circuit 300 may be read in connection with the method 200, but is not limited thereto. The circuit 300 is configured to receive a first signal from a first base station (corresponding to step 3 of method 200) and to receive a second signal from a second base station different from the first base station (corresponding to step 4 of method 200). The signals may be received at one or more antenna ports 10, for example. The circuit 300 includes a first channel estimator 8 configured to determine a first channel estimate based on the first signal (corresponding to step 5 of method 200) and a second channel estimator 9 configured to determine a second channel estimate based on the second signal (corresponding to step 6 of method 200). The circuit 300 further includes a unit 11 configured to determine a feedback information based on the first channel estimate and based on the second channel estimate (corresponding to step 7 of method 200). It is noted that a more detailed operation of a circuit similar to the circuit 300 is described below.

A method for determining feedback information in accordance with the disclosure is described in the following. The method is similar to method 200 and may be performed by a circuit similar to circuit 300.

The circuit 300 may receive a signal including data transmitted by a first and second base station, respectively. It is understood that the circuit 300 may additionally receive data or signals from further base stations. The circuit 300 may be included in a mobile station having one or more receive antennas wherein each of the receive antennas may be coupled to a respective antenna port 10 of the circuit 300. The received analog signals may be down-converted to an intermediate band or a baseband. The analog down-converted signals may be sampled by a sampling unit and converted into the digital domain by an analog/digital converter. It is noted that components to perform such steps may particularly be arranged between the antenna ports 10 and the channel estimators 8 and 9.

For example, a mobile station including the circuit 300 may receive an OFDM signal from $N_{TX}^1$ transmit antennas of the first base station and from $N_{TX}^2$, transmit antennas of the second base station at $N_{RX}$ receive antennas of the mobile station. The OFDM signal may be based on an arbitrary number of K subcarriers labeled with an index k. The received signal may be forwarded to $N_{RX}$ receive antenna ports 10 of the circuit 300 wherein each antenna port 10 may be assigned to a respective receive antenna of the mobile station.

For an arbitrary number of N sampling time instants, labeled by an index n, a down-converted digital baseband signal $y_{k,n}$ for the k-th subcarrier at the n-th time instant may be expressed by $$y_{k,n}=H_{k,n}W_ix_{k,n}+v_{k,n}. \quad (1)$$

$H_{k,n}$ denotes a channel matrix associated with the subcarrier k at the time instant n, $x_{k,n}$ denotes a symbol vector including symbols transmitted from the base stations and $v_{k,n}$ denotes white, complex-valued Gaussian noise having a variance of $\sigma n^2$. The parameter $W_i$ denotes a precoding matrix including precoding weights that have been used by the first and second base station to precode the transmitted symbols $x_{k,n}$. The index i of the parameter $W_i$ identifies the respective precoding weights that have been chosen from a codebook W (i.e. $W_i \in W$). It is noted that an exemplary signal pattern of a signal in accordance with equation (1) is illustrated in FIG. 4.

The channels between the first base station and the circuit 300 may be expressed by a first channel estimate, for example by a first channel matrix $H_{k,n}^1$ that may be complex-valued and may have a dimension of $N_{RX} \times N_{TX}^1$. Similarly, the channels between the second base station and the circuit 300 may be expressed by a second channel estimate, for example by a second channel matrix $H_{k,n}^2$ that may be complex-valued and may have a dimension of $N_{RX} \times N_{TX}^2$. The first channel matrix $H_{k,n}^1$, and the second channel matrix $H_{k,n}^2$ may be determined by the first channel estimator 8 and the second channel estimator 9. A respective channel estimation may be based on pilot signals that have been received by the circuit 300 from the respective base station. For example, the first channel matrix may be determined based on pilot symbols that have been transmitted by the first base station. It is understood that the channel estimation may also be performed in any other suitable manner.

The channel matrix $H_{k,n}$ of equation (1) may be expressed by $$H_{k,n} = (H_{k,n}^1 H_{k,n}^2), \quad (2)$$

where $H_{k,n}$ is a matrix that may be complex-valued and may have a dimension of $N_{RX} \times (N_{TX}^1 \ N_{TX}^2)$. For a more general case of a system including an arbitrary number of N base stations, the channel matrix $H_{k,n}$ may be expressed by $$H_{k,n} = (H_{k,n}^1 \ldots H_{k,n}^N) \quad (3)$$

having a dimension of $$N_{RX} \times \sum_{i=1}^{N} N_{TX}^i.$$

It is noted that each of the received symbol vector $y_{k,n}$ and the noise vector $v_{k,n}$ may be complex-valued and may have a dimension of $N_{RX} \times 1$. The symbol vector $x_{k,n}$ may be complex-valued and may have dimension of $(N_{TX}^1 + N_{TX}^2) \times 1$. Note further that the dimension of the symbol vector $x_{k,n}$ and the precoding matrix $W_i$ may additionally depend on the number of useful spatial transmission layers L. Fpr example, $x_{k,n} \in A^{L \times 1}$, wherein A denotes a symbol alphabet used by the considered base station.

In equations (2) and (3), the channel matrices of the cooperating base stations are merged into one channel matrix $H_{k,n}$. In particular, the channel matrix $H_{k,n}$ may correspond to a matrix that is formed by a concatenation of the individual channel matrices associated with the cooperating base stations. In a similar manner, the precoding matrix $W_i$, the symbol vector $x_{k,n}$ and the noise $v_{k,n}$ may be merged from parameters associated with the respective base stations. For example, the symbol vector $x_{k,n}$ may be expressed by $$x_{k,n} = \begin{pmatrix} x_{k,n}^1 \\ x_{k,n}^2 \end{pmatrix}, \quad (4)$$

wherein $x_{k,n}^1$ and $x_{k,n}^2$ denote the symbol vectors transmitted by the first and second base station, respectively.

The first base station and the second base station may be located at different physical locations separated by a certain distance. In contrast to this, the channel matrix $H_{k,n}$ may be regarded as a channel estimate associated with a single base station having a number of $(N_{TX}^1 + N_{TX}^2)$ transmit antennas. It is noted that determining feedback information based on a merged channel matrix as described herein thus takes into account cross-correlation between the cooperating base stations by enabling the mobile station to report a joint feedback information that is determined based on the merged channel matrix.

The construction of the channel matrix $H_{k,n}$ does not require a distinction as to whether a transmit antenna belongs to the first base station or the second base station. It is therefore possible to reorder (or interchange) the columns of the matrix $H_{k,n}$ in an arbitrary manner. However, it is understood that the further parameters of equation (1), for example the precoding matrix $W_i$, the symbol vector $x_{k,n}$ and the noise $v_{k,n}$, will also be reordered accordingly.

In this connection, it is noted that the described scheme does not have to distinguish between the scrambling codes that have been used by the cooperating base stations. For example, since the channel matrix can be seen as a model for a single base station including $(N_{TX}^1 + N_{TX}^2)$ transmit antennas (in which it does not matter whether a transmit antenna is actually associated with the first base station or the second base station), a distinction between scrambling codes used by the cooperating base stations may be unnecessary. The described method may therefore be used in a scenario in which the first signal and the second signal are based on a same scrambling code, but also in a scenario where the first signal and the second signal are based on different scrambling codes. Similarly, the described method may be used in a scenario in which the first signal and the second signal are based on a same pseudo-random sequence, but also in a scenario where the first signal and the second signal are based on different pseudo-random sequences.

The digital baseband signal $y_{k,n}$ of equation (1) may be filtered by a filter (not shown), such as for example a linear equalizer described by a filter matrix $F_{k,n}$. For example, the filter matrix $F_{k,n}$ may include filter coefficients that may have been determined based on a channel estimation. A filtered symbol vector $r_{k,n}$ may be expressed by $$r_{k,n} = F_{k,n} y_{k,n} \quad (5)$$

or (using equation (1)) by $$r_{k,n} = F_{k,n} H_{k,n} W_i x_{k,n} + F_{k,n} v_{k,n}. \quad (6)$$

The term $F_{k,n} H_{k,n} W_i$ may be expressed by a matrix $$K_{k,n} = F_{k,n} H_{k,n} W_i \quad (7)$$

of dimension L×L.

Based on the merged channel matrix of equations (2) and (3), a feedback information in form of a PMI value and an RI value may be determined. The PMI value may be determined by maximizing a mutual information for a chosen range of subcarriers 1 to K and a chosen range of time instants 1 to N. In a similar fashion a throughput of the system may be maximized. Denoting the mutual information of a resource element (k,n) as $I_{k,n}$, a desired precoding matrix $W_j$ (and a PMI value associated therewith) may be determined according to $$W_j = \underset{W_i \in W}{\operatorname{argmax}} \sum_{k=1}^{K} \sum_{n=1}^{N} I_{k,n}(W_i). \quad (8)$$

Since the channel matrix $H_{k,n}$ may be regarded as a channel estimate associated with a single base station having a number of $(N_{TX}^1 + N_{TX}^2)$ transmit antennas, an optimization of the mutual information according to equation (8) may take into account precoding matrices $W_i$ associated with such systems including $(N_{TX}^1 + N_{TX}^2)$ transmit antennas.

The mutual information $I_{k,n}$ of a resource element (k,n) may be expressed by $$I_{k,n} = \sum_{l=1}^{L} \log_2(1 + SINR_{k,n,l}), \quad (9)$$

wherein $SINR_{k,n,l}$ denotes a post-equalization Signal to Interference and Noise Ratio associated with the k-th subcarrier, the n-th time instant and the l-th transmission layer.

The SINR may be expressed by $$SINR_{k,n,l} = \frac{|K_{k,n}(1,1)|^2}{\sum_{i \neq 1} |K_{k,n}(1,i)|^2 + \sigma_n^2 \sum_i F_{k,n}(1,i)}, \quad (10)$$

wherein $K_{k,n}(l,i)$ denotes the l-th row and i-th column of the matrix $K_{k,n}$. In a similar fashion, $F_{k,n}(l,i)$ denotes the l-th row and i-th column of the matrix $F_{k,n}$.

Referring to the above, a PMI value and an RI value may be determined as follows. The first channel estimator 8 and the second channel estimator 9 may determine channel matrices $H_{k,n}^1$ and $H_{k,n}^2$, respectively. The channel matrices $H_{k,n}^1$ and $H_{k,n}^2$ may be merged to an overall channel matrix $H_{k,n}$ according to equation (2) or (3). In addition, the noise (plus interference) power $\sigma_n^2$ may be determined by the circuit 300 as well. Determining the noise power $\sigma_n^2$ may be based on one or more resource elements which may be muted with respect to the first base station and with respect to the second base station. This way, the determined noise power does not include interferences caused by the first and the second base station. Further details on signal patterns including muted resource elements are provided in connection with FIGS. 4 to 7. Knowing the values of the channel matrix $H_{k,n}$, the noise power $\sigma_n^2$ and the filter matrix $F_{k,n}$, the mutual information may be determined for possible precoding matrices and spatial layer numbers (see sum in equation (8)). The precoding matrix and rank indicator providing the maximum value according to equation (8) then may correspond to a desired PMI value and RI value that may be fed back to a base station.

Besides a PMI value and RI value, further feedback information may determined based on a channel matrix constructed according to equation (2) or (3). For example, a CQI may be determined by determining a merged channel matrix and using the merged channel matrix in an arbitrary scheme to calculate CQI values, for example the scheme described in the reference of Schwarz.

The determined feedback information may be transmitted from the mobile station to the first base station and the second base station. For this purpose, the circuit 300 may be configured to operate as a transmitter. It is thus understood that the circuit 300 may include additional components required to transmit a signal including the feedback information in an Uplink direction. For example, the circuit 300 may include a digital/analogue converter for converting digital signals into analogue signals, an up-conversion mixer for converting the analogue signals to a radio-frequency band and/or a power amplifier, etc. The feedback information may be transmitted to each of the first and second base stations separately. Alternatively, one of the first and second base station may operate as a serving base station. In this case, the feedback information may be transmitted to the serving base station, and the serving base stations may inform or notify the remaining base station of the feedback information.

The feedback information may be transmitted to base stations that provided signals used to determine the feedback information. However, it is understood that the feedback information may also be transmitted to and used by base stations that did not provide signals used to determine the feedback information. For example, a radio communications system may include a mobile station a three base stations. The feedback information may then be determined based on signals transmitted by only two of the base stations while the feedback information may be provided to all three base stations.

FIG. 4 illustrates a signal pattern in a time-frequency representation which may be used for performing methods in accordance with the disclosure. For example, the signal pattern may be employed by an OFDM system including a mobile station, a first base station and a second base station. Each of the base stations may have four antenna ports. In FIG. 4, the signal patterns of two subframes of index I and I+N are illustrated. Further subframes arranged between the two illustrated subframes are indicated by dots. The signal pattern of a subframe is divided into 12 subcarriers and 14 time instants. The signal pattern thus includes 168 resource elements wherein a corresponding resource element for a specific subcarrier and a specific time instant is represented by a small square. The resource elements arranged in a same horizontal row are associated with a same subcarrier labeled by an index k, while the resource elements arranged in a same vertical column are associated with a same time instant labeled by an index n. In the following, the resource element for the k-th subcarrier and the n-th time instant is denoted as (k,n).

In the subframe of index I+N, the resource elements (2,6), (2,7), (4,6), (4,7), (8,6), (8,7), (10,6) and (10,7) may be muted with respect to the first and the second base station. That is, for the corresponding subcarriers and time instants, the first and the second base station suppress or stop a transmission of data. Due to the muting of the indicated resource elements, a determined noise (plus interference) power thus may not include interferences between and caused by the two base stations. It is noted that the positions of the muted resource elements may be predetermined, but may be chosen in an arbitrary manner. Signal patterns that may be used for a similar system, but using a different arrangement of muted resource elements are described in connection with FIG. 5.

A noise power may be determined based on the muted resource elements. In FIG. 4, a number of muted resource elements corresponds to the number of antenna ports, namely eight. However, in further examples the number of muted resource elements may not necessarily relate to the number of antenna ports and/or the number of cooperating base stations. The number of muted resource elements can be seen as a system design parameter which may determine an accuracy of the noise (plus interference) measurement. A common noise power may be determined based on the muted resource elements. For example, the common noise power may correspond to a mean of the measured noise plus interference over all muted resource elements (e.g., in this case eight). In another example, the common noise power may correspond to a mean of the measured noise plus interference over a subset of the muted resource elements. It is noted that the scheme for determining a common noise power as well as the decision on which muted resource elements are used for such determination may be varied and adjusted by the mobile station, for example depending on the present scenario. The common noise power may be used in the above specified scheme for determining feedback information (e.g. as described in equation (10)).

A noise power may be determined according to $$\sigma_n^2 = E(\|t_{muted}\|^2), \quad (11)$$

for example, wherein $\|\cdot\|$ denotes a norm, $y_{muted}$ denotes the muted resource elements and $E(\cdot)$ denotes an expectation operator.

For the case of a circuit employing noise-whitening it may also be possible to estimate a noise plus interference covariance matrix $R_n$ according to $$R_n = E(y_{muted} y_{muted}^H), \quad (12)$$

wherein H denotes hermitian conjugation. Referring back to equation (10), an SINR may then be expressed by $$SINR_{k,n,1} = \frac{|\tilde{K}_{k,n}(1,1)|^2}{\sum_{i \neq 1} |\tilde{K}_{k,n}(1,i)|^2 + \sum_i \tilde{F}_{k,n}(1,i)}, \quad (13)$$

wherein $$\tilde{K}_{k,n} = \tilde{F}_{k,n} \tilde{H}_{k,n} W_i \quad (14)$$

and $$\tilde{H}_{k,n} = R_n^{-1/2} H_{k,n}. \quad (15)$$

The parameter $R_n^{-1/2}$ may be expressed by $$R_n^{-1/2} = (\mathrm{chol}(R_n))^{-1}, \quad (16)$$

wherein $\mathrm{chol}(\cdot)$ denotes a Cholesky decomposition.

In addition to the determined noise power, channel matrices $H_{k,n}^1$ and $H_{k,n}^2$ associated with the first and second base station may be determined. Based on the obtained noise power and the obtained channel matrices, a feedback information (e.g. PMI, RI, CQI) may be calculated according to the above described scheme.

In a subframe of index I, determined feedback information may be transmitted from the mobile station to the first and the second base station. For such transmission, resource elements at predetermined, but arbitrary positions may be used. In FIG. 4, resource elements (4,6), (4,7), (10,6) and (10,7) may be used for a transmission of feedback information to the first base station while resource elements (2,6), (2,7), (8,6) and (8,7) may be used for a transmission of feedback information to the second base station.

Since the steps of determining the noise power and transmitting the feedback information are arranged in different subframes, the steps may be delayed with respect to each other. It is noted that such time delay may not necessarily have a significant impact for a case of slow changing channel conditions (e.g. for the case of a mobile station moving at a speed of about 30 km/h or less).

FIG. 5 illustrates a signal pattern in a time-frequency representation which may be used to perform methods in accordance with the disclosure. For example, the signal pattern may be employed by an OFDM system including a mobile station, a first base station and a second base station. Each of the base stations may have four antenna ports. Comments made in connection with the previously described signal patterns of FIG. 4 may also hold true for FIG. 5.

In FIG. 5, muted resource elements used for determining the noise power may be arranged in different subframes. Four muted resource elements (2,6), (2,7), (8,6), and (8,7) may be arranged in the I-th subframe, and four muted resource elements (4,6), (4,7), (10,6), and (10,7) may be arranged in the (I+N)-th subframe. It is understood that an arbitrary different combination of subframes may be chosen to locate the muted resource elements. The resource elements (4,6), (4,7), (10,6) and (10,7) in the I-th subframe may be used for transmitting the feedback information from the mobile station to the first base station. In addition, the resource elements (2,6), (2,7), (8,6) and (8,7) in the (I+N)-th subframe may be used for transmitting the feedback information from the mobile station to the second base station.

FIG. 6 illustrates a signal pattern in a time-frequency representation which may be used to perform methods in accordance with the disclosure. For example, the signal pattern may be employed by an OFDM system including a mobile station and three base stations. One of the base stations may have four antenna ports while each of the remaining two base stations may have two antenna ports. Comments made in connection with the previously described signal patterns of FIGS. 4 and 5 may also hold true for FIG. 6.

In a subframe of index I+N, the resource elements (2,6), (2,7), (4,6), (4,7), (8,6), (8,7), (10,6) and (10,7) may be muted with respect to the three base stations. That is, for the corresponding subcarriers and time instants, the base stations suppress or stop a transmission of data. Due to the muting at the indicated resource elements, the determined noise (plus interference) power thus may not include interferences between and caused by the three base stations.

In a subframe of index I, determined feedback information may be transmitted from the mobile station to the three base stations. In FIG. 6, four resource elements (4,6), (4,7), (10,6) and (10,7) may be used for transmitting feedback information to the first base station. Two resource elements (2,6) and (2,7) may be used for transmitting the feedback information to the second base station. Further, two resource elements (8,6) and (8,7) may be used for transmitting the feedback information to the third base station.

FIG. 7 illustrates a signal pattern in a time-frequency representation which may be used to perform methods in accordance with the disclosure. For example, the signal pattern may be employed by an OFDM system including a mobile station and three base stations. One of the base stations may have four antenna ports while each of the remaining two base stations may have two antenna ports. Comments made in connection with the previously described signal patterns of FIGS. 4-6 may also hold true for FIG. 7.

In FIG. 7, muted resource elements used for determining the noise power may be arranged in different subframes. Four muted resource elements (2,6), (2,7), (8,6) and (8,7) may be arranged in the I-th subframe, and four muted resource elements (4,6), (4,7), (10,6) and (10,7) may be arranged in the (I+N)-th subframe. Resource elements (4,6), (4,7), (10,6) and (10,7) used for transmitting feedback information from the mobile station to the first base stations may be arranged in the I-th subframe. Resource elements (2,6) and (2,7) used for transmitting feedback information from the mobile station to the second base station may be arranged in the (I+N)-th subframe. In addition, resource elements (8,6) and (8,7) used for transmitting feedback information from the mobile station to the third base station may be arranged in the (I+N)-th subframe FIG. 8 is a flow chart illustrating a method 800 in accordance with the disclosure including method acts 11 to 14. At 11, first signals are received at R antenna ports of a circuit from N transmit antennas of a first base station. At 12, second signals are received at the R antenna ports of the circuit from M transmit antennas of a second base station which is different from the first base station. Here, $R \geq 1$ and/or $N \geq 1$ and/or $M \geq 1$. At 13, a channel matrix is determined based on the first signals and based on the second signals wherein the channel matrix corresponds to an R×(N+M) matrix. At 14, a feedback information is determined based on the channel matrix.

The comments made in connection with the above-described scheme for determining feedback information may also hold true for method 800. For example, the method step 13 may be based on equation (3), and the method step 14 may be based on equations (8) to (10).

FIG. 9 illustrates an exemplary circuit 900 in accordance with the disclosure. An operation of the circuit 900 may be read in connection with the method 800, but is not limited thereto. The circuit 900 may include R antenna ports 10 configured to receive first signals from N transmit antennas of a first base station (corresponding to step 11 of method 800) and to receive second signals from M transmit antennas of a second base station different from the first base station (corresponding to step 12 of method 800). Here, R≥1 and/or N≥1 and/or M≥1. The circuit 900 further includes a channel estimator 15 configured to determine a channel matrix based on the first signals and based on the second signals wherein the channel matrix corresponds to an R×(N+M) matrix (corresponding to step 13 of method 800). The circuit 900 further includes a unit 16 configured to determine a feedback information based on the channel matrix (corresponding to step 14 of method 800).

FIG. 10 is a flow chart that illustrates a method 1000 in accordance with the disclosure including method acts 17 to 20. At 17, a first signal is received at a circuit from a first base station. At 18, a second signal is received at the circuit from a second base station which is different than the first base station. At 19, a noise power is determined based on a resource element wherein the resource element is muted with respect to the first base station and with respect to the second base station. For example, the noise power may be determined based on a signal pattern similar to any of the signal patterns described in connection with FIGS. 4 to 7. At 20, a feedback information is determined based on the noise power. For example, determining the feedback information may be based on equations (8) to (10).

FIGS. 11A to 12B are graphs that schematically illustrate the performance of radio communications systems wherein a throughput in Mbps is plotted against an SNR in dB. In each of FIGS. 11A to 12B, lines including small triangles relate to a throughput in a conventional CoMP system while lines including small diamonds relate to a throughput in a system operating in accordance with the disclosure.

Figure 11B:
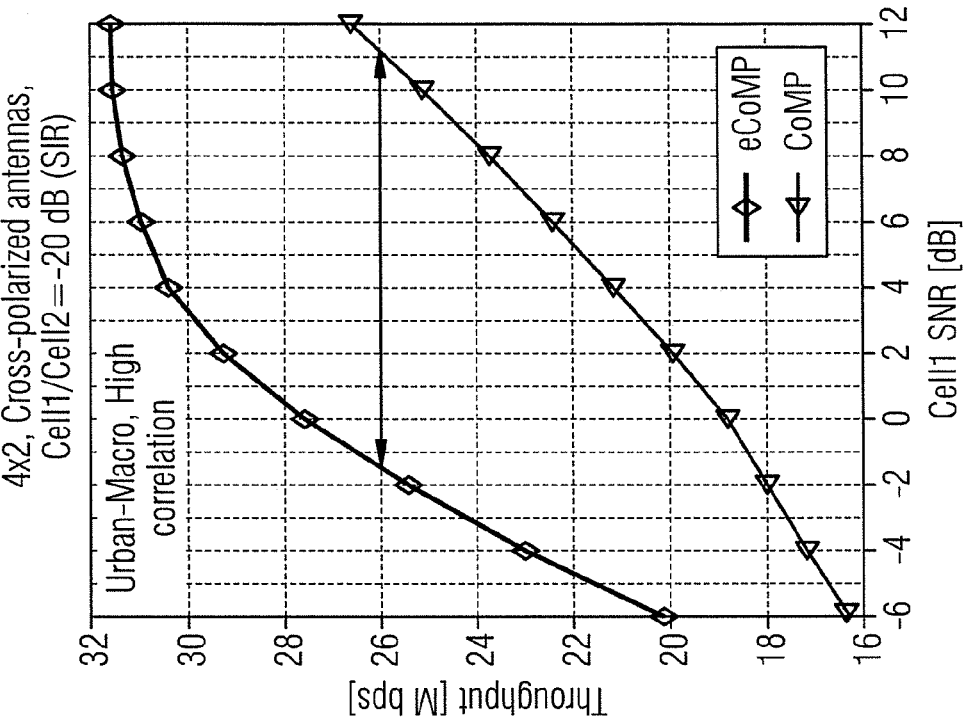
FIGS. 11A and 11B are graphs that illustrate the performance of a radio communications system including a macro cell and a pico cell.
Figure 11A:
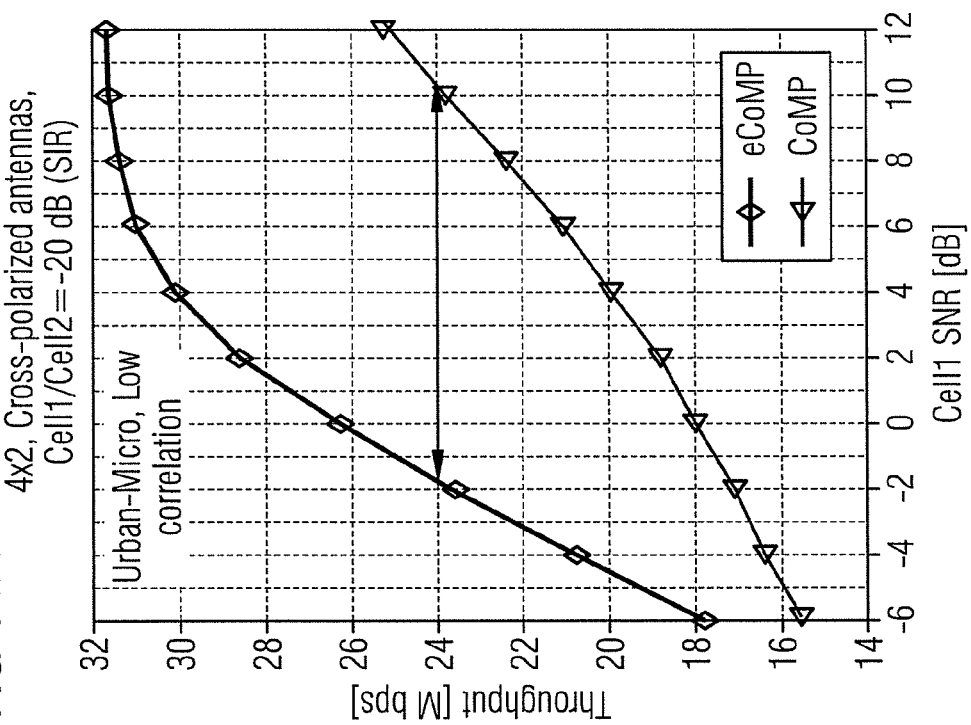

FIGS. 11A and 11B relate to different scenarios in a heterogeneous network including a macro cell and a pico cell. The macro cell is a dominating cell transmitting with high power while the pico cell transmits with a lower power. A pico mobile station operation in a high cell range expansion of 20 dB (SIR=−20 dB) is expected. As it can be seen from FIGS. 11A and 11B, the network operating in accordance with the disclosure may outperform the conventional system by 6 to 12 dB depending on the considered SNR region.

Figure 12A:
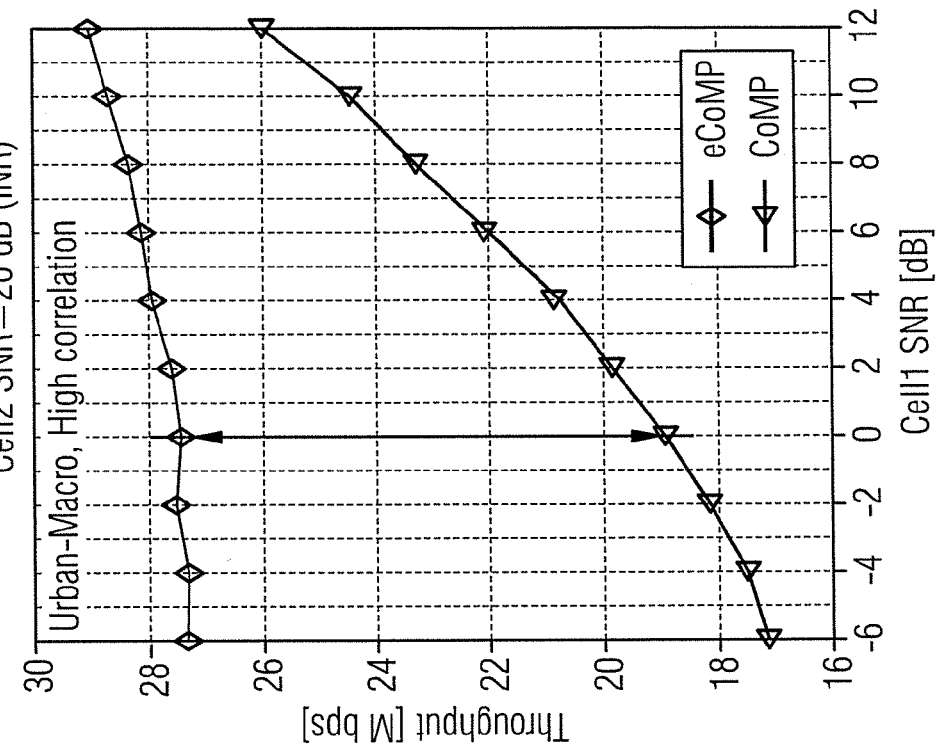
FIGS. 12A and 12B are graphs that illustrate the performance of a radio communications system including two macro cells.
Figure 12B:
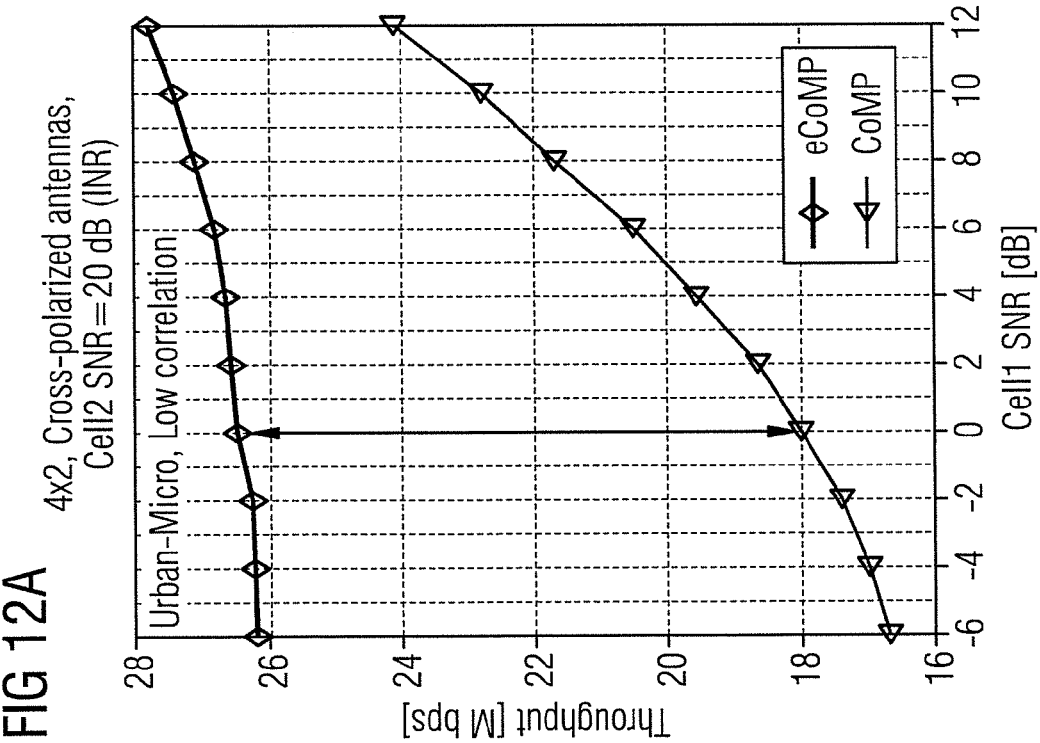

FIGS. 12A and 12B relate to a homogenous network including two macro cells operating in a cooperative mode. The simulated scenario corresponds to an operating point at the cell edge where interference noise ratio (I/N) is 20 dB. As can be seen from FIGS. 12A and 12B, the network operating in accordance with the disclosure may outperform the conventional system. In addition, the scheme in accordance with the disclosure provides near constant throughput across the cell range.

While the disclosure has been illustrated and described with respect to one or more implementations, alterations and/or modifications may be made to the illustrated examples without departing from the spirit and scope of the appended claims. Also, techniques, systems, subsystems and methods described and illustrated in the various aspects may be combined with other techniques, systems, subsystems and methods without departing from the scope of the present disclosure. Other examples of changes, substitutions and alterations are ascertainable by one skilled in the art and could be made without departing from the spirit and scope disclosed herein.

What is claimed is:

1. A method, comprising:
receiving a first signal at a circuit from a first base station;
receiving a second signal at the circuit from a second base station that is different than the first base station;
determining a first channel estimate based on the first signal;
determining a second channel estimate based on the second signal;
determining a noise power based on a resource element, wherein the resource element is muted with respect to the first base station and with respect to the second base station, wherein, for a subcarrier and a time instant associated with the resource element, the first base station suppresses transmission of the first signal and the second base station suppresses transmission of the second signal; and
determining a feedback information based on the first channel estimate, the second channel estimate, and the noise power, wherein the feedback information is based at least in part on a cross-correlation between the first signal and the second signal,
wherein the feedback information is based at least in part on a signal-to-interference-plus-noise ratio (SINR), wherein the SINR for a k-th subcarrier, an n-th time instant, and an I-th transmission layer is given by $SINR_{k,n,I}$, wherein $$SINR_{k,n,I} = \frac{|\tilde{K}_{k,n}(l, l)|^2}{\sum_{i \neq l} |\tilde{K}_{k,n}(l, i)|^2 + \sum_{i} \tilde{F}_{k,n}(l, i)},$$

wherein $\tilde{K}_{k,n}(I,i)$ is an element in an I-th row and an i-th column of a matrix $\tilde{K}_{k,n}$, wherein $\tilde{F}_{k,n}(I,i)$ is an element in an I-th row and an i-th column of a matrix $\tilde{F}_{k,n}$ that is a function of a filter matrix $F_{k,n}$ that represents filter coefficients, and wherein the matrix $\tilde{K}_{k,n}$ is a function of the filter matrix $F_{k,n}$ and a channel matrix that is based on the first signal and based on the second signal.

2. The method of claim 1, further comprising:
determining the channel matrix based on the first channel estimate and the second channel estimate, wherein determining the feedback information is based on the channel matrix.

3. The method of claim 2, wherein the channel matrix corresponds to a channel estimate formed by a concatenation of the first channel estimate and the second channel estimate.

4. The method of claim 2,
wherein the first signal is received at R antenna ports of the circuit from N transmit antennas of the first base station,
wherein the second signal is received at the R antenna ports of the circuit from M transmit antennas of the second base station, and
wherein the channel matrix corresponds to a matrix with dimensions R×(N+M), wherein R, N and M are positive integers.

5. The method of claim 4, wherein each entry of the channel matrix corresponds to a channel between a first receive antenna coupled to a first antenna port of the circuit and a transmit antenna of the first base station or between a second receive antenna coupled to a second antenna port of the circuit and a transmit antenna of the second base station.

6. The method of claim 1, wherein the resource element comprises a predetermined position in a two-dimensional signal pattern of a time-frequency representation.

7. The method of claim 1, wherein the first signal and the second signal are based on a same scrambling code.

8. The method of claim 1, wherein the first signal and the second signal are based on different scrambling codes.

9. The method of claim 1, further comprising:
transmitting the feedback information in an Uplink direction.

10. The method of claim 9, further comprising:
transmitting the feedback information to a serving base station; and
transmitting the feedback information from the serving base station to at least one of the first base station and the second base station.

11. The method of claim 1, wherein the feedback information comprises at least one of a Precoding Matrix Indicator, a Rank Indicator, and a Channel Quality Indicator.

12. The method of claim 1, wherein the feedback information is determined to maximize at least one of a throughput and a mutual information.

13. The method of claim 1, wherein the circuit is comprised within a mobile station.

14. A circuit, comprising:
one or more antenna ports configured to receive a first signal from a first base station and to receive a second signal from a second base station that is different than the first base station;
a first channel estimator configured to determine a first channel estimate based on the first signal;
a second channel estimator configured to determine a second channel estimate based on the second signal; and
a unit configured to determine a noise power based on a resource element, wherein the resource element is muted with respect to the first base station and with respect to the second base station, wherein, for a subcarrier and a time instant associated with the resource element, the first base station suppresses transmission of the first signal and the second base station suppresses transmission of the second signal, and wherein the unit is further configured to determine a feedback information based on the first channel estimate, the second channel estimate, and the noise power, wherein the feedback information is based at least in part on a cross-correlation between the first signal and the second signal,
wherein the feedback information is based at least in part on a signal-to-interference-plus-noise ratio (SINR), wherein the SINR for a k-th subcarrier, an n-th time instant, and an l-th transmission layer is given by $SINR_{k,n,l}$, wherein $$SINR_{k,n,l} = \frac{|\tilde{K}_{k,n}(l,l)|^2}{\sum_{i \neq l} |\tilde{K}_{k,n}(l,i)|^2 + \sum_{i} \tilde{F}_{k,n}(l,i)},$$

wherein $\tilde{K}_{k,n}(l,i)$ is an element in an l-th row and an i-th column of a matrix $\tilde{K}_{k,n}$, wherein $\tilde{F}_{k,n}(l,i)$ is an element in an l-th row and an i-th column of a matrix $\tilde{F}_{k,n}$ that is a function of a filter matrix $F_{k,n}$ that represents filter coefficients and wherein the matrix $\tilde{K}_{k,n}$ is a function of the filter matrix $F_{k,n}$ and a channel matrix that is based on the first signal and based on the second signal.

15. The circuit of claim 14,
wherein the circuit is configured to determine a channel matrix based on the first channel estimate and based on the second channel estimate,
wherein the first signal is received at R antenna ports of the circuit from N transmit antennas of the first base station,
wherein the second signal is received at the R antenna ports of the circuit from M transmit antennas of the second base station,
wherein the channel matrix corresponds to a matrix with dimensions R×(N+M), and
wherein the feedback information is based on the channel matrix, wherein R, N and M are positive integers.

16. A method, comprising:
receiving first signals at R antenna ports of a circuit from N transmit antennas of a first base station;
receiving second signals at the R antenna ports of the circuit from M transmit antennas of a second base station that is different than the first base station;
determining a channel matrix based on the first signals and based on the second signals, wherein the channel matrix corresponds to a matrix with dimensions R×(N+M), wherein R, N and M are positive integers;
determining a noise power based on a resource element, wherein the resource element is muted with respect to the first base station and with respect to the second base station, wherein, for a subcarrier and a time instant associated with the resource element, the first base station suppresses transmission of the first signal and the second base station suppresses transmission of the second signal; and
determining a feedback information based on the channel matrix and the noise power, wherein the feedback information is based at least in part on a cross-correlation between the first signals and the second signals,
wherein the feedback information is based at least in part on a signal-to-interference-plus-noise ratio (SINR), wherein the SINR for a k-th subcarrier, an n-th time instant, and an l-th transmission layer is given by $SINR_{k,n,l}$, wherein $$SINR_{k,n,l} = \frac{|\tilde{K}_{k,n}(l,l)|^2}{\sum_{i \neq l} |\tilde{K}_{k,n}(l,i)|^2 + \sum_{i} \tilde{F}_{k,n}(l,i)},$$

wherein $\tilde{K}_{k,n}(l,i)$ is an element in an l-th row and an i-th column of a matrix $\tilde{K}_{k,n}$, wherein $\tilde{F}_{k,n}(l,i)$ is an element in an l-th row and an i-th column of a matrix $\tilde{F}_{k,n}$ that is a function of a filter matrix $F_{k,n}$ that represents filter coefficients, and wherein the matrix $\tilde{K}_{k,n}$ is a function of the filter matrix $F_{k,n}$ and the channel matrix that is based on the first signals and based on the second signals.

17. A circuit, comprising:
R antenna ports configured to receive first signals from N transmit antennas of a first base station and to receive second signals from M transmit antennas of a second base station that is different than the first base station, wherein R, N and M are positive integers;
a channel estimator configured to determine a channel matrix based on the first signals and based on the second signals, wherein the channel matrix corresponds to a matrix with dimensions R×(N+M); and
a unit configured to determine a noise power based on a resource element, wherein the resource element is muted with respect to the first base station and with respect to the second base station, wherein, for a subcarrier and a time instant associated with the resource element, the first base station suppresses transmission of the first signal and the second base station suppresses transmission of the second signal, and wherein the unit is further configured to determine a feedback information based on the channel matrix and the noise power, wherein the feedback information is based at least in part on a cross-correlation between the first signals and the second signals, wherein the feedback information is based at least in part on a signal-to-interference-plus-noise ratio (SINR), wherein the SINR for a k-th subcarrier, an n-th time instant and an l-th transmission layer is given by $SINR_{k,n,l}$, wherein $$SINR_{k,n,l} = \frac{|\tilde{K}_{k,n}(l,l)|^2}{\sum_{i \neq l}|\tilde{K}_{k,n}(l,i)|^2 + \sum_{i}\tilde{F}_{k,n}(l,i)},$$

wherein $\tilde{K}_{k,n}(l,i)$ is an element in an l-th row and an i-th column of a matrix $\tilde{K}_{k,n}$, wherein $\tilde{F}_{k,n}(l,i)$ is an element in an l-th row and an i-th column of a matrix $\tilde{F}_{k,n}$ that is a function of a filter matrix $F_{k,n}$ that resents filter coefficients and wherein the matrix $\tilde{K}_{k,n}$ is a function of the filter matrix $F_{k,n}$ and the channel matrix that is based on the first signals and based on the second signals.

18. The circuit of claim 17, wherein the matrix $\tilde{K}_{k,n}$ is defined as $\tilde{K}_{k,n} = \tilde{F}_{k,n}\tilde{H}_{k,n}W_i$, wherein $\tilde{H}_{k,n} = R_n^{-1/2}H_{k,n}$, wherein $W_i$ is a precoding matrix, wherein $R_n^{-1/2} = (\text{chol}(R_n))^{-1}$, wherein $\text{chol}(R_n)$ is a Cholesky decomposition of a noise plus interference covariance matrix $R_n$, and wherein $H_{k,n}$ is the channel matrix that is based on the first signals and based on the second signals.

19. The circuit of claim 17, wherein the resource element is one of N+M resource elements that are muted with respect to the first base station and with respect to the second base station, wherein, for each of the N+M resource elements, the first base station suppresses transmission of the first signal and the second base station suppresses transmission of the second signal for an associated subcarrier and an associated time instant associated with that resource element.

* * * * *